(12) United States Patent
Gordley

(10) Patent No.: US 7,265,820 B1
(45) Date of Patent: Sep. 4, 2007

(54) METHOD OF DETERMINING ATMOSPHERIC REFRACTION PROFILE USING TWO SPATIALLY SEPARATED LIGHT SOURCES

(75) Inventor: Larry L. Gordley, Grafton, VA (US)

(73) Assignee: G & A Technical Software, Inc., Newport News, VA (US)

( * ) Notice: Subject to any disclaimer, the term of this patent is extended or adjusted under 35 U.S.C. 154(b) by 122 days.

(21) Appl. No.: 11/209,874

(22) Filed: Aug. 23, 2005

(51) Int. Cl.
  *G01C 3/00* (2006.01)
(52) U.S. Cl. ..................... 356/3.01; 356/3.1
(58) Field of Classification Search ........... 356/3.01
  See application file for complete search history.

(56) References Cited

U.S. PATENT DOCUMENTS 3,688,189 A * 8/1972 Lamb ................... 324/642
4,093,918 A * 6/1978 Hitney ................... 702/2
6,298,313 B1 * 10/2001 Trahan ................. 702/166

* cited by examiner

*Primary Examiner*—Thomas H. Tarcza
*Assistant Examiner*—Luke D Ratcliffe
(74) *Attorney, Agent, or Firm*—Peter J. Van Bergen

(57) ABSTRACT

An atmospheric refraction profile is determined using an imaging system positioned at a location that is simultaneously within line-of-sight of two celestial light sources. A variety of active or passive methods can be employed to cause the line-of-sight to vertically traverse through a refractive portion of an atmosphere. Images of the two celestial light sources are captured as the line-of-sight vertically traverses through the refractive portion of the atmosphere. Each such image indicates an apparent distance between the two celestial light sources. The apparent distances are used to determine refraction angles.

20 Claims, 4 Drawing Sheets

METHOD OF DETERMINING ATMOSPHERIC REFRACTION PROFILE USING TWO SPATIALLY SEPARATED LIGHT SOURCES

FIELD OF THE INVENTION

The invention relates generally to atmospheric refraction measurements, and more particularly to a method and system for determining an atmospheric refraction profile that is not affected by sensor motion.

BACKGROUND OF THE INVENTION

Occultation sensing of an atmosphere (e.g., the earth's atmosphere) is a well-developed and highly useful technique. Briefly, occultation sensing involves passing light through an atmosphere's limb and then viewing the light at a remotely-located sensor (e.g., a sensor in orbit in or beyond the atmosphere). The sensed light is analyzed to determine the properties of the occulting atmosphere.

The output of occultation sensors can be used to infer an atmosphere's temperature profile as a function of altitude based on either an extinction or refraction profile of the light passed through the atmosphere's limb. In both techniques, light from a single source (e.g., a star) is sensed after that light passes through the atmosphere. The light is typically sensed using a sensor mounted on an orbiting satellite or a moving spacecraft.

The disadvantage of using the extinction technique is that one must know the concentration profiles of the absorbing gases in the atmosphere (e.g., $CO_2$). However, it is difficult to know a concentration profile with a great deal of precision since it can vary with altitude, atmospheric conditions, seasonal conditions, etc., thereby affecting the precision of a determined extinction profile.

To determine the refraction profile, a sensor's orientation, movement, and direction of movement must be monitored so that measurements can be appropriately adjusted. However, it is extremely difficult to control/measure satellite or spacecraft motion with sufficient precision to make the refraction technique viable. That is, typical sensor platform motions include many oscillating and non-linear components that produce uncertainties exceeding performance capabilities of measurement systems and processing schemes.

SUMMARY OF THE INVENTION

Accordingly, it is an object of the present invention to provide a method and system for determining an atmospheric refraction profile.

Another object of the present invention is to provide a method of determining an atmospheric refraction profile that is unaffected by sensor platform motion.

Other objects and advantages of the present invention will become more obvious hereinafter in the specification and drawings.

In accordance with the present invention, an atmospheric refraction profile is determined using an imaging system. The imaging system is positioned at a location that is simultaneously within line-of-sight of two celestial light sources separated by a fixed distance. A variety of active or passive methods can be employed to cause the line-of-sight to vertically traverse through a refractive portion of an atmosphere. An image of the two celestial light sources is captured at a plurality of times as the line-of-sight vertically traverses through the refractive portion of the atmosphere. Each such image indicates an apparent distance between the two celestial light sources associated with a position in the refractive portion of the atmosphere. Accordingly, a plurality of apparent distances corresponding to the plurality of times is defined. A plurality of refraction angles corresponding to the plurality of times based on differences between the fixed distance and each of the apparent distances are then determined.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Prior to describing the method and system of the present invention, a brief description of refraction geometry associated with light passing through an atmosphere will be provided herein. By way of example, the earth and its refractive atmosphere will be discussed. However, it is to be understood that the same refraction geometry principles apply to any atmosphere and that the method and system of the present invention can be used to determine the refraction profile of any atmosphere, which, in turn, can be used to determine the atmosphere's temperature/pressure profile.

Figure 1:
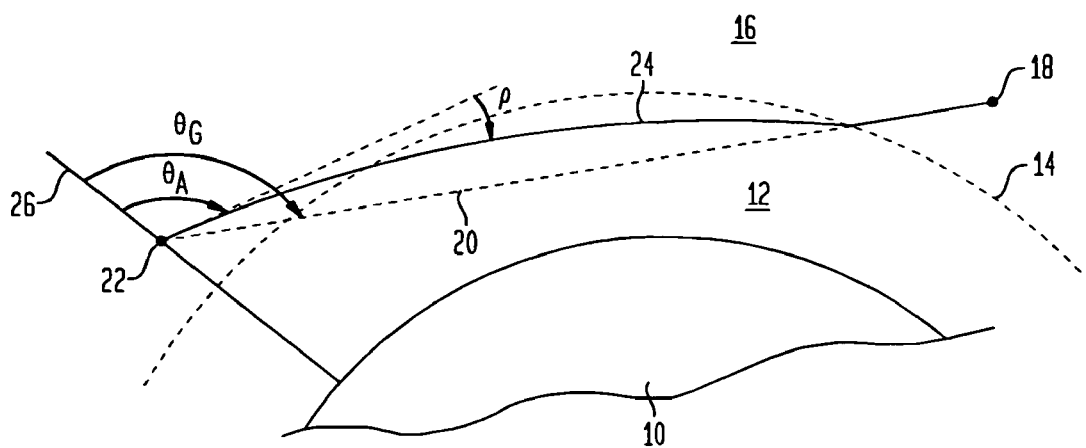
FIG. 1 is a diagrammatic view of a portion of the earth and its refractive atmosphere as well as the refraction geometry associated with light passing through the refractive atmosphere.

Referring now to the drawings, and more particularly to FIG. 1, the earth is referenced by numeral 10 and the earth's refractive atmosphere 12 lies between earth 10 and the dashed line referenced by numeral 14. As is known in the art, the earth's refractive atmosphere 12 is that portion of the earth's atmosphere that will cause a light beam to bend or refract as it passes therethrough. Accordingly, points residing beyond or outside of refractive atmosphere 12 are considered for purposes of the present invention discussion to be in (non-refractive) space 16.

A light source 18 which can be located in space 16 (as shown) or in refractive atmosphere 12 is within a line-of-sight 20 of a sensor 22 which can be located in space 16 (as shown) or in refractive atmosphere 12. The relative positions of light source 18 and sensor 22 are such that line-of-sight 20 at least partially passes through refractive atmosphere 12. (For example, light source 18 could be the sun and sensor 22 could be mounted on an orbiting satellite or moving spacecraft.) Because of this, light produced by light source 18 does not appear to travel along line-of-sight 20 in the "eyes" of sensor 22 due to refraction. Rather, sensor 22 receives light from light source 18 along a bent or refracted light path 24. As is well known in the art, the angle of refraction ρ is defined as the change in direction of refracted light path 24 from the point at which it enters refractive atmosphere 12 to where it is received at sensor 22. The angle of refraction changes as a function of altitude in refractive atmosphere 12. That is, the angle of refraction increases at lower tangent heights, i.e., the altitude of refracted light path 24 at its point of closest approach to earth 10. This is because the index of refraction of air increases with the density thereof.

From a purely geometric perspective, the angle of refraction ρ is approximately equal to the difference between the apparent and geometric zenith angles $\theta_A$ and $\theta_G$, respectively, as illustrated in FIG. 1. As is known in the art, the geometric zenith angle $\theta_G$ is the angle between a zenith line 26 (passing through sensor 22 and the center of the earth 10) and line-of-sight 20. The apparent zenith angle $\theta_A$ is the angle between zenith line 26 and refracted light path 24 at sensor 22. While the geometric zenith angle $\theta_G$ can be obtained from well-defined orbital parameters and the position of light source 18 (e.g., the sun), determining the apparent zenith angle $\theta_A$ must take sensor platform orientation and motion into consideration. Unfortunately, as mentioned previously, the uncertainties associated with such sensor orientation and motion make it difficult to determine the apparent zenith angle $\theta_A$.

Figure 2:
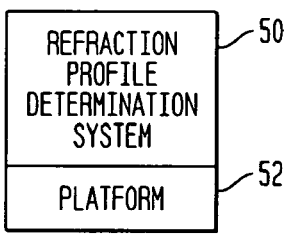
FIG. 2 is a diagrammatic view of a portion of the earth and its refractive atmosphere as well as the relative positions of two celestial light sources and the system for determining an atmospheric refraction profile in accordance with an embodiment of the present invention.
Figure 2:
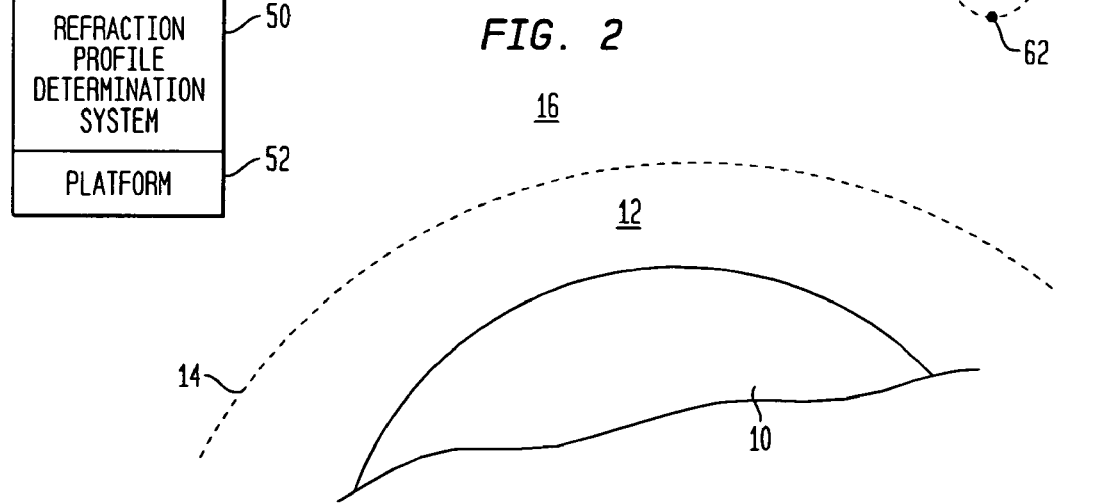

The present invention avoids the problems associated with sensor orientation/motion by utilizing a technique and system that eliminates the effects of sensor platform motion. The invention will now be described with reference to FIGS. 2-5. In FIG. 2, a system 50 for determining a refraction profile of refractive atmosphere 12 in accordance with the present invention is illustrated at a position in a region of space 16 outside of refractive atmosphere 12. Typically, system 50 is mounted on a moving platform 52 such as an orbiting satellite or self-propelled spacecraft. During operation of the present invention, system 50 is in constant line-of-sight with two celestial light sources 60 and 62 separated from one another by a fixed distance. Accordingly, celestial light sources 60 and 62 can be any two stars, planets, etc., in space 16 generating a sufficient amount of light that can be detected by system 50. Celestial light sources 60 and 62 could also be realized by using diametrically-opposing locations on the earth's sun which is represented by dashed line 64. By way of non-limiting example, it will be assumed for the remainder of this description that light sources 60 and 62 are defined as diametrically-opposing locations on sun 64.

Figure 3:
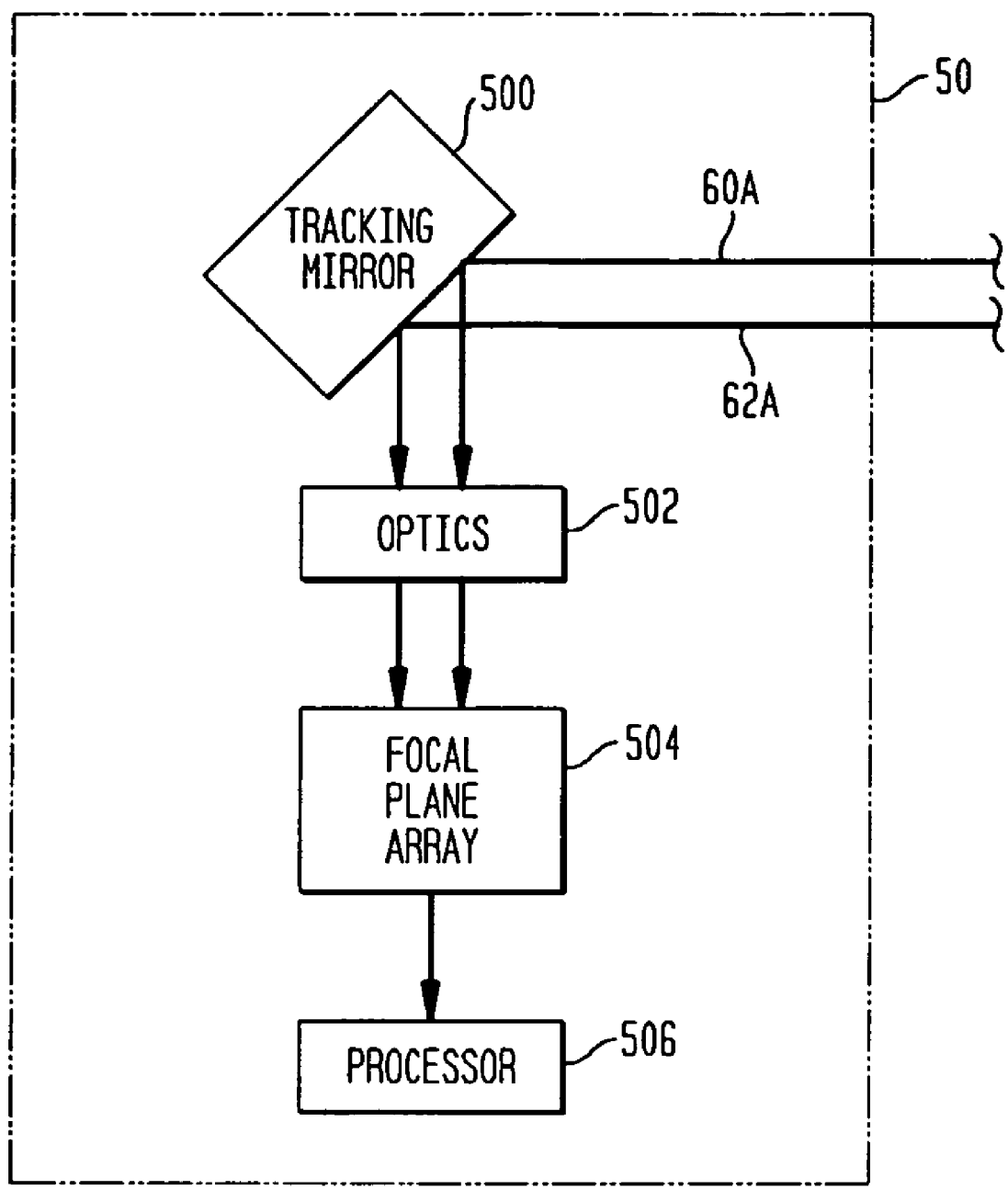
FIG. 3 is a block diagram of a refractive profile determination system used to implement the method of the present invention.
Figure 4:
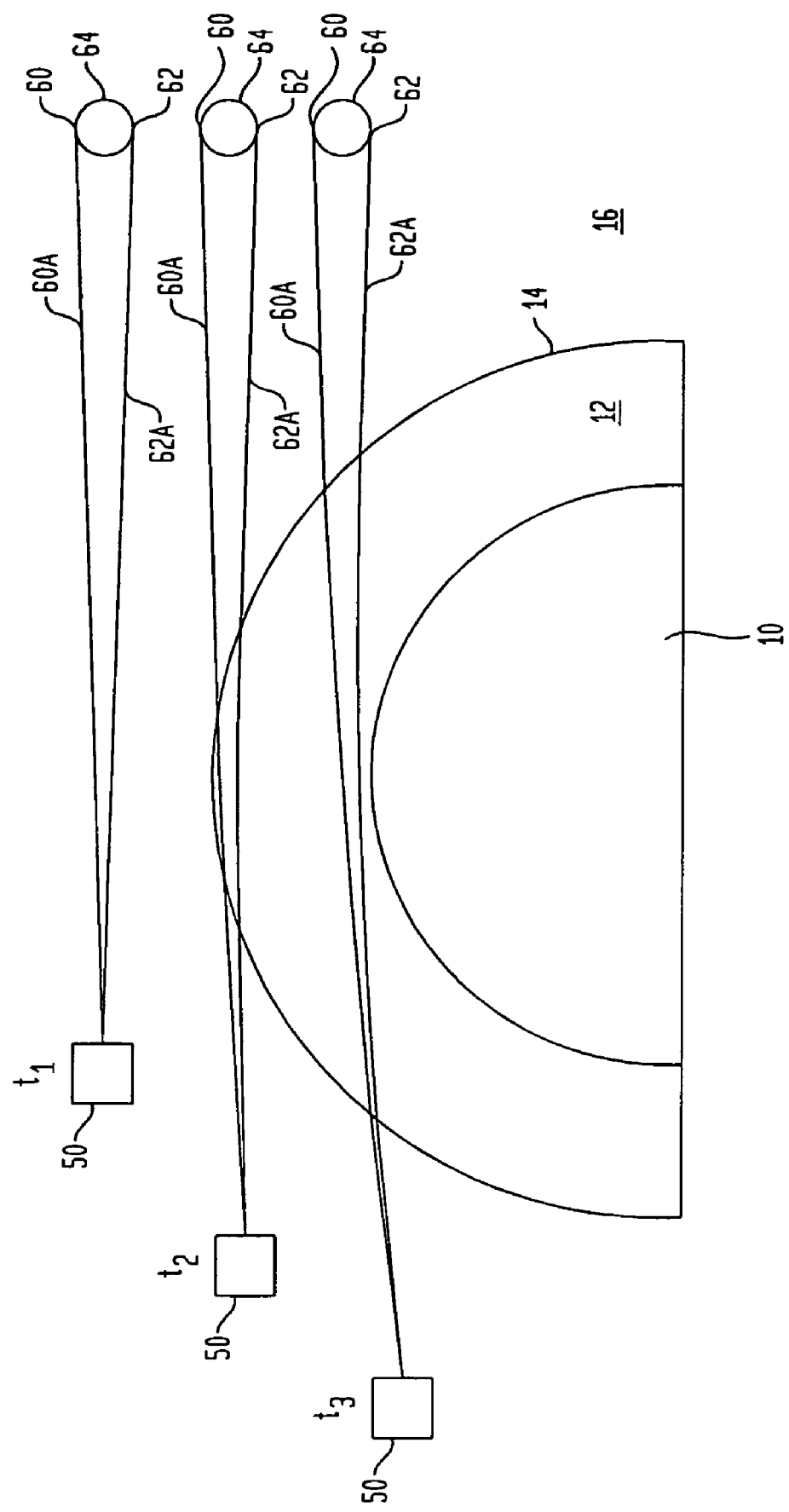
FIG. 4 is a diagrammatic view of a portion of the earth and its refractive atmosphere and the relative positions of the sun and the refractive profile determination system at a plurality of measurement times in accordance with an embodiment of the present invention.

System 50 is essentially an image capture and processing system capable of detecting the two paths of light originating from sources 60 and 62, generating a two-dimensional image of sources 60 and 62, and processing this image to determine an angular difference between the two paths of light incident on system 50. A block diagram of an embodiment of system 50 is illustrated in FIG. 3 where light from sources 60 and 62 respectively follows paths 60A and 62A which are incident on a tracking mirror 500 that is movable to stay in constant line-of-sight with sources 60 and 62. The received light is focused by optics 502 onto a focal plane array 504 which generates a two-dimensional, pixelized image of the relative positions of light sources 60 and 62. Such tracking mirrors, optics, and focal plane arrays are well known in the art. A processor 506 is coupled to focal plane array 504 and is programmed to determine the angular difference between light paths 60A and 62A that is indicative of the "apparent" distance between sources 60 and 62. The term "apparent" is used here because the angular difference between paths 60A and 62A is dependent upon the amount of refraction each path experiences at any given measurement time. For example, if a measurement of the angular difference between paths 60A and 62A is taken when the line-of-sight from system 50 to sources 60 and 62 passes only through space 16 (as shown in FIG. 2), the "apparent" angular difference between paths 60A and 62A is the actual angular difference since light along both paths experiences zero refraction. Thus, an angular difference measurement taken with the positioning in FIG. 2 (referred to hereinafter as time $t_0$) provides an actual measurement of the angular difference (defined herein as $D_0$) between paths 60A and 62A which is a fixed measurement owing to the constant diameter of the sun 64. Alternatively, the actual angular difference $D_0$ used in the present invention could be a quantity that is known a priori.

To determine the refraction profile associated with a portion or region of the refractive atmosphere, a plurality of apparent angular difference measurements are taken/collected as paths 60A and 62A traverse vertically through the region of interest. This process will be explained with reference to FIG. 4 where the relative positions of system 50 and the sun 64 are shown for each of three distinct measurement times $t_1$, $t_2$ and $t_3$, to facilitate an understanding of the present invention. At time $t_1$, paths 60A and 62A pass only through space 16 where there is no refraction thereof. At time $t_2$, both paths 60A and 62A experience refraction as the line-of-sight between system 50 and sources 60 and 62 has moved vertically downward through refractive atmosphere 12 so that both paths 60A and 62A pass through refractive atmosphere 12. Since the density of refractive atmosphere 12 increases at lower altitudes, path 62A experiences a greater level of refraction than path 60A at time $t_2$. At time $t_3$, the line-of-sight to sources 60 and 62 has moved further vertically downward with both paths 60A and 62A experiencing a greater amount of refraction as compared to time $t_2$ with path 62A (at time $t_3$) experiencing more refraction than path 60A (at time $t_3$). It is to be understood that many more measurement times can be utilized in the present invention.

The vertical traversing of the line-of-sight (from system 50 to sources 60/62) through refractive atmosphere 12 can be caused in a variety of ways without departing from the scope of the present invention. For example, as mentioned above, system 50 can be mounted on a moving platform 52 that moves in space 16. System 50 could also be relatively stationary in space 16 and be positioned such that earth 10 passes between system 50 and the sun 64 during the earth's normal orbit. Further, while the illustrative example shows the line-of-sight vertically traversing downward through refractive atmosphere 12, the present invention could also be implemented by having the line-of-sight traverse vertically upward through refractive atmosphere 12.

During the vertical traverse of the line-of-sight (between system 50 and sources 60/62), there is a time delay (defined herein as "τ") for one source to traverse the fixed distance $D_0$ therebetween. For example, referring to FIG. 4 and the time $t_1$, the time $t_1$ location of source 60 was passed through by source 62 at a previous time defined as ($t_1-\tau$). Given this, the refraction angle ρ at any given time t can be determined directly from the apparent angular difference D(t) between light paths 60A and 62A as follows $$\rho(t) = D_0 + \rho(t-\tau) - D(t)$$

Figure 5:
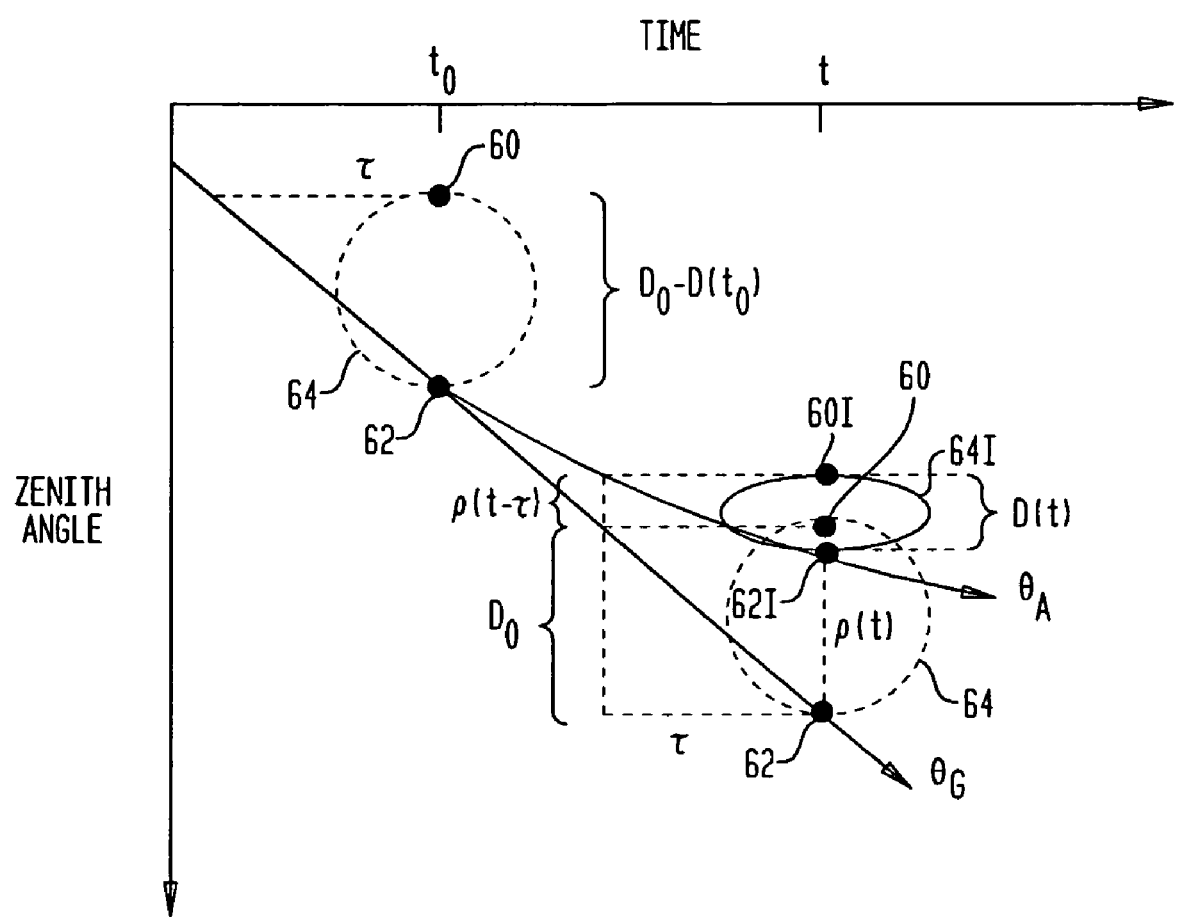
FIG. 5 is a plot of the geometric and apparent zenith angles associated with the setting sun as viewed through earth's refractive atmosphere along with the actual and apparent images of the sun superimposed on the plot.

This relationship can be explained in a visual sense with reference to FIG. 5 where the geometric zenith angle $\theta_G$ and the apparent zenith angle $\theta_A$ are plotted versus time. At time $t_0$, the line-of-sight to both sources 60 and 62 (i.e., diametrically-opposed locations on the sun 64) is completely through a space region beyond the confines of the earth's refractive atmosphere. As a result, the actual angular difference $D_0$ (indicative of the distance between sources 60 and 62) is equal to the apparent angular difference $D(t_0)$ measured at time $t_0$ by the system/method of the present invention. However, at time t, sources 60 and 62 are viewed through the refractive atmosphere such that the sun's image 64I appears flattened. Thus, the apparent angular difference D(t) is defined by the apparent images 60I and 62I of sources 60 and 62. The refraction angle $\rho(t)$ is equal to the angular difference between the actual and apparent zenith angles. The actual angular difference $D_0$ remains constant while the refraction angle $\rho(t-\tau)$ refers to the refraction angle that source 62 experienced when it was located at the time t location of source 60.

The advantages of the present invention are numerous. The refraction profile of an atmospheric region is obtained directly through measurements of apparent angular differences between two celestial light sources as the line-of-sight between the sources and a measurement system vertically traverses through a refractive atmosphere. Orientation and/or motion of the measurement system is of no consequence thereby assuring a precise refraction profile determination. Since analysis of the measurements need not occur in real time, the vertical traversing can be either up or down relative to a planetary body's refractive atmosphere. The vertical traversing of the line-of-sight can be caused in a variety of ways without departing from the scope of the present invention. That is, the present invention can be implemented by (i) actively moving a measurement system onboard an orbiting satellite or self-propelled spacecraft, or (ii) passively allowing the vertical traversing to occur by locating the measurement system on/at a relatively stationary platform (e.g., balloon, a moon, another planet, etc.) and allowing interplanetary motion to cause vertical traversing of the line-of-sight. The refraction profile determined by the method/system of the present invention can be utilized by itself or used to derive/retrieve a temperature profile of the corresponding region of the refractive atmosphere. Such methods of deducing a temperature profile from a refraction profile are well understood in the art.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of determining an atmospheric refraction profile, comprising the steps of:
   providing an imaging system;
   positioning said imaging system at a location that is simultaneously within line-of-sight of two celestial light sources separated by at least a fixed vertical distance;
   causing said line-of-sight to vertically traverse through a refractive portion of an atmosphere; and
   capturing an image of the two celestial light sources at a plurality of times as said line-of-sight vertically traverses through said refractive portion of the atmosphere, wherein each said image indicates an apparent distance between the two celestial light sources associated with a position in said refractive portion of the atmosphere thereby defining a plurality of apparent distances corresponding to said plurality of times, and wherein a plurality of refraction angles corresponding to said plurality of times are based on differences between said fixed vertical distance and each of said plurality of apparent distances.

2. A method according to claim 1 wherein said location is in a region of space beyond said refractive portion of the atmosphere.

3. A method according to claim 1 wherein the imaging system is mounted on a satellite, and wherein said step of causing comprises the step of moving the satellite in an orbit about said refractive portion of the atmosphere.

4. A method according to claim 1 wherein the imaging system is mounted on a spacecraft, and wherein said step of causing comprises the step of propelling the spacecraft in space beyond said refractive portion of the atmosphere.

5. A method according to claim 1 wherein the two celestial light sources comprise diametrically-opposing locations on the earth's sun.

6. A method according to claim 5 wherein the diametrically-opposing locations are aligned with the vertical traverse of said line-of-sight.

7. A method according to claim 1 wherein the two celestial light sources comprise diametrically-opposing locations on the earth's sun, wherein said location is in a region of space beyond said refractive portion of the atmosphere, and wherein said step of causing comprises the step of allowing the earth to pass between said location and the earth's sun.

8. A method of determining an atmospheric refraction profile, comprising the steps of:
   providing an imaging system;
   positioning said imaging system at a location that is simultaneously within line-of-sight of first and second celestial light sources separated by a fixed angular distance ($D_0$);
   causing said line-of-sight to vertically traverse through a refractive portion of an atmosphere wherein the first celestial light source leads the second celestial light source during the vertical traverse of said refractive portion of the atmosphere, and wherein a time delay ($\tau$) is defined as the time it takes for the second of the celestial light sources to vertically traverse said fixed angular distance; and
   capturing an image of the first and second celestial light sources at a plurality of times (t) as said line-of-sight vertically traverses through said refractive portion of the atmosphere, wherein each said image indicates an apparent angular distance between the first and second celestial light sources associated with a position in said refractive portion of the atmosphere thereby defining a plurality of apparent angular distances (D(t)) corresponding to said plurality of times, and wherein a plurality of refraction angles $\rho(t)$ corresponding to said plurality of times are given by $$\rho(t) = \rho(t-\tau) + D_0 - D(t).$$

9. A method according to claim 8 wherein said location is in a region of space beyond said refractive portion of the atmosphere.

10. A method according to claim 8 wherein the imaging system is mounted on a satellite, and wherein said step of causing comprises the step of moving the satellite in an orbit about said refractive portion of the atmosphere.

11. A method according to claim 8 wherein the imaging system is mounted on a spacecraft, and wherein said step of causing comprises the step of propelling the spacecraft in space beyond said refractive portion of the atmosphere.

12. A method according to claim 8 wherein the first and second celestial light sources comprise diametrically-opposing locations on the earth's sun.

13. A method according to claim 12 wherein the diametrically-opposing locations are aligned with the vertical traverse of said line-of-sight.

14. A method according to claim 8 wherein the first and second celestial light sources comprise diametrically-opposing locations on the earth's sun, wherein said location is in a region of space beyond said refractive portion of the atmosphere, and wherein said step of causing comprises the step of allowing the earth to pass between said location and the earth's sun.

15. A method according to claim 9 further comprising the step of capturing an in-space image of the first and second celestial light sources when said line-of-sight passes only through a region of space that does not include said refractive portion of the atmosphere wherein said in-space image indicates said fixed angular distance.

16. A system for determining an atmospheric refraction profile, comprising:

an imaging system adapted to be positioned at a location that is simultaneously within line-of-sight of first and second celestial light sources separated by a fixed angular distance ($D_0$) with said line-of-sight being vertically traversed through a refractive portion of an atmosphere wherein the first celestial light source leads the second celestial light source during the vertical traverse of said refractive portion of the atmosphere, and wherein a time delay ($\tau$) is defined as the time it takes for the second of the celestial light sources to vertically traverse said fixed angular distance, said imaging system capturing an image of the first and second celestial light sources at a plurality of times (t) as said line-of-sight vertically traverses through said refractive portion of the atmosphere, wherein each said image indicates an apparent angular distance between the first and second celestial light sources associated with a position in said refractive portion of the atmosphere thereby defining a plurality of apparent angular distances (D(t)) corresponding to said plurality of times; and a processor coupled to said imaging system for generating a plurality of refraction angles ρ(t) corresponding to said plurality of times in accordance with $$\rho(t)=\rho(t-\tau)+D_0-D(t).$$

17. A system as in claim 16 wherein said imaging system is a two-dimensional imaging system.

18. A system as in claim 16 wherein said imaging system includes a focal plane array.

19. A system as in claim 16 further comprising a satellite on which said imaging system is mounted, said satellite moving in an orbit about said refractive portion of the atmosphere.

20. A system as in claim 16 further comprising a spacecraft on which said imaging system is mounted, said spacecraft being propelled in space beyond said refractive portion of the atmosphere.

* * * * *